(No Model.) 2 Sheets—Sheet 1.
T. MUNNELL.
CASH REGISTER.
No. 416,119. Patented Nov. 26, 1889.
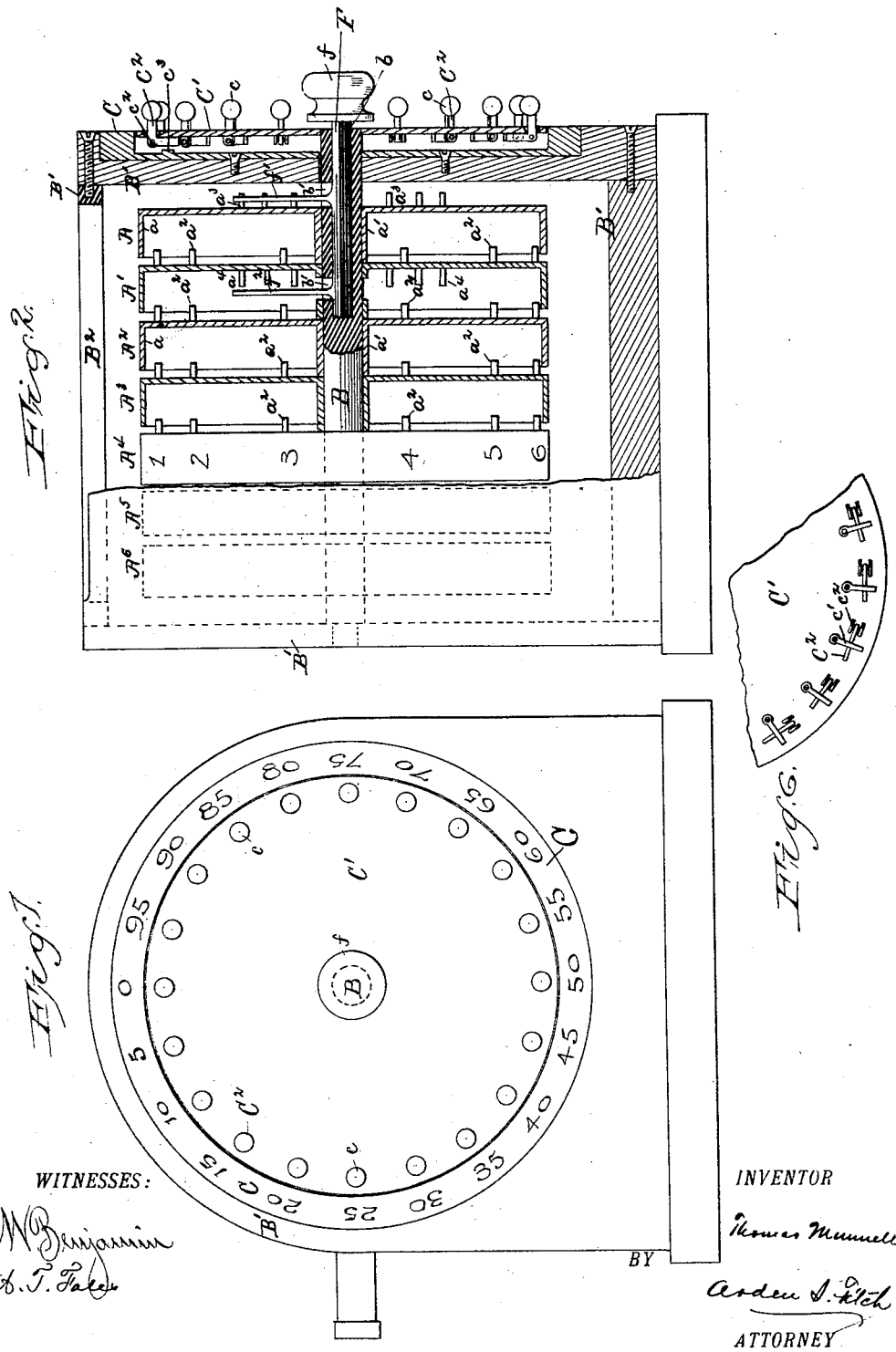

(No Model.)  2 Sheets—Sheet 2.

T. MUNNELL.
CASH REGISTER.

No. 416,119. Patented Nov. 26, 1889.

WITNESSES:

INVENTOR
Thomas Munnell
BY Arden L. Fitch
ATTORNEY.

UNITED STATES PATENT OFFICE.

THOMAS MUNNELL, OF CARTHAGE, OHIO.

CASH-REGISTER.

SPECIFICATION forming part of Letters Patent No. 416,119, dated November 26, 1889.

Application filed February 19, 1889. Serial No. 300,481. (No model.)

*To all whom it may concern:*

Be it known that I, THOMAS MUNNELL, of Carthage, county of Hamilton, State of Ohio, a citizen of the United States, have invented certain new and useful Improvements in Cash-Registers, of which the following is a full, clear, and exact description, reference being had to the accompanying drawings, forming part of this specification.

My invention relates to a device known as a "cash-register;" and my invention consists in the combinations of parts and devices hereinafter described, constructed and arranged to operate as set forth, and as more particularly recited in the claims.

Figure 4:
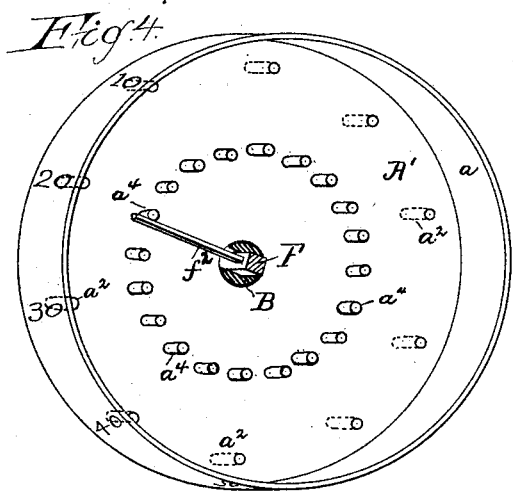
Figure 5:
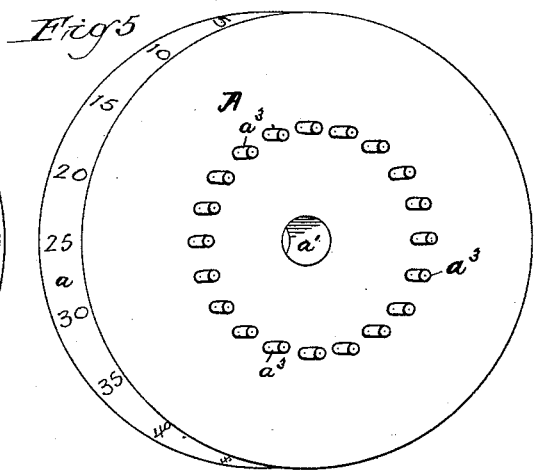
Figure 3:
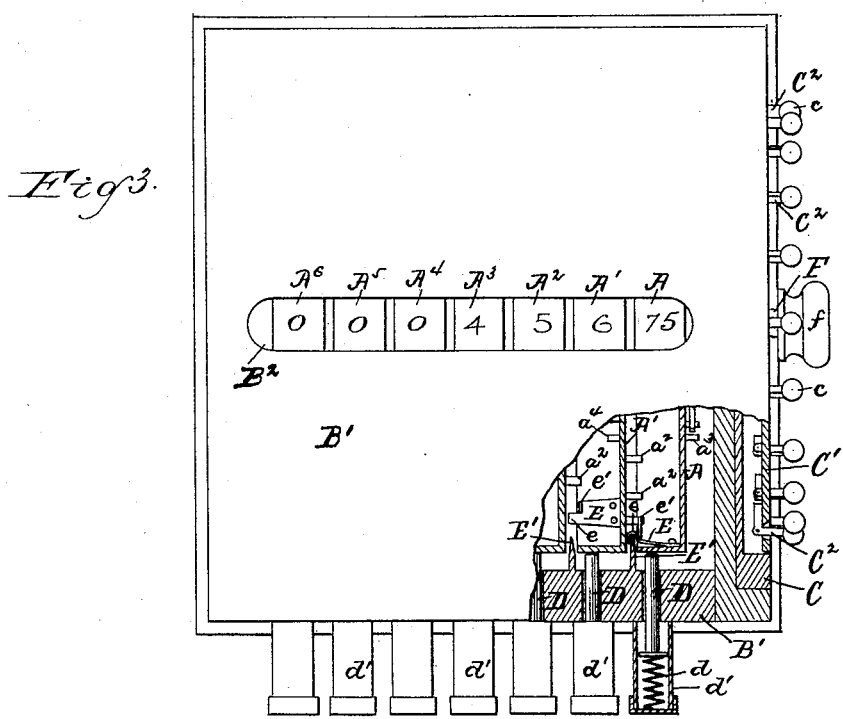
Figure 7:
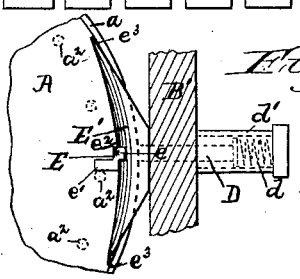

Figure 1 is a front elevation of a cash-register containing my invention. Fig. 2 is a side elevation of the same, partly in vertical central section. Fig. 3 is a plan of the apparatus, a part of the interior devices being shown in horizontal cross-section. Fig. 4 is an elevation in perspective, looking toward the interior thereof, of one of my registering-disks. Fig. 5 is a similar view, looking toward the exterior thereof, of the disk of the series which I employ to register cents. Fig. 6 is an elevation, looking at the rearward face, of a segment of the hand-wheel for operating the registering-disks, and showing the motion-limiting stop-levers thereon; and Fig. 7 is a side elevation, in detail, of a segment of one of the registering-disks, and showing the devices I employ for enabling one of the disks of the series to engage and properly rotate an adjacent disk.

The principal features of my present invention are, first, the combination of a series of registering-disks, each bearing upon its peripheral face a series of digits or numbers in a definite arithmetical progression, with the devices hereinafter described, whereby the said disks are capable of rotation individually or one with another, and an inclosing-case provided with a slot extending in a line over the peripheries of the series of disks, and through which is therefore visible one of the numbers or digits of the series thereof on each disk; and, second, in the combination of devices hereinafter described, whereby a single hand-wheel for operating the disks may be made to serve to rotate either one of two disks at option, so as to effect the registering of either dollars or cents, as desired and intended.

A A' A², &c., represents a series of disks, each one having a peripheral face, preferably constituted by a flange $a$, said series being mounted to turn loosely on a shaft B, common to all the disks, and which said shaft is preferably horizontal in the inclosing-case B' of the apparatus and has bearings in the end walls of said case, as shown. The disks are so arranged upon their common shaft as to have a space between the adjacent members of the series, and this may be accomplished by giving each disk a hub $a'$, which is wider than the flange $a$, and which abuts against the perimeter of the disk adjacent to it in the series, as shown. The number of disks in the series may be varied; but I find that a series of seven disks, as shown, which makes a cash-register capable of registering substantially one million dollars, is sufficient for all practical purposes.

C is a dial fixed on the front of the case B', and with the shaft B extending centrally through it. Upon the forward extended end of said shaft is fixed a hand-wheel or circular plate C', and of less diameter than said dial. The dial is preferably centrally recessed to receive the hand-wheel, as shown, and a space is left between the rear face of the hand-wheel and the front or recessed face of the dial. The perimeter or face of the dial visible beyond the rim of the wheel C' thus constitutes an annulus within which the hand-wheel may revolve with its shaft B. Upon this annulus of the dial are arranged in uniform arithmetical progression the series of numbers which are to be registered by the hereinafter-described disks, and which, in case dollars and cents are to be thus registered, consists in the numbers from zero to ninety-five—to wit, a division of one hundred into twenty equal parts or multiples of five, with the zero desirably at the top of the dial vertically above the shaft B, and the said numbers of the series being arranged on said dial at equal distances apart, as shown.

C² represents a series of bell-crank stop-levers carried by the hand-wheel C', and equal in number to the series of figures on the dial and at equal distances apart on said wheel, so that a lever is opposite each figure of the series on the dial. One arm of each lever extends through a slot in the hand-wheel and is furnished on its front end with a knob or handle $c$, while the other arm thereof, when in normal position at rest, lies against and parallel to the plane of the rear face of the hand-wheel, it being there detained and retracted to such position after being moved, as presently described, by a spring $c'$, as shown. Each lever is pivoted, as shown at $c^2$, preferably on the rear face of the hand-wheel. When the shaft is to be rotated for the purpose of registering, and the knob on the forward arm of the lever opposite to the number to be registered is grasped for the purpose of turning the hand-wheel and shaft until said number is opposite zero, as hereinafter set forth, the grasping of said knob will tend or operate to tilt or swing the lever, so that its rearward arm will project from the rearward face of said hand-wheel toward the surface beneath said wheel, so that it will strike against a projection or stop $c^3$, set adjacent to the line of said zero-mark, thus stopping the rotation of the hand-wheel. Thereupon when the lever is released, its spring will retract it to its described normal position.

I make no claim herein for novelty in the levers $C^2$ on the hand-wheel in connection with the described motion-limiting stop, as these devices are substantially described and claimed in Letters Patent No. 354,483, granted to me December 14, 1886.

The disk A, which is the first one of the series, bears on its peripheral face the series of numbers from zero to ninety-five in progressive multiples of five equidistant in succession, similarly to the series of the same numbers on the dial C, so that said disk A is adapted to register five cents and multiples thereof up to ninety-five cents. This is plainly shown in Fig. 5. The remaining disks of the series, which register dollars, each bears upon its peripheral face the series of ten digits or numbers from zero to nine equidistant in regular succession, as shown in Fig. 4.

D represents rods, one of which is given frictional contact with or impingement upon the periphery of each disk, as a brake to hold the disk at rest upon the shaft B while the shaft is rotating, and when the disk is not rotated in registering, as hereinafter described. The rods D have play in suitable apertures or bearings in the case-wall, and are actuated by springs $d$, which may be contained in cylinders $d'$, mounted on the case-wall, as shown, and capped or closed at their external ends, as seen in Fig. 3. These brakes serve to hold the disks at rest while the shaft is rotating, and when they are rotated, as hereinafter described, the friction exerted by the brakes is overcome by the disk-actuating devices.

At E are shown spring-arms, fixed one to each disk, preferably on the inner face of the disk-flange $a$, and with an end $e$ reaching beyond the rim of the flange toward the next disk of the series. Each said arm carries a finger $e'$ angular to said arm and turned or extended toward the axis of the disk, as shown in Fig. 3.

E' are fixed guides, preferably mounted on the interior of the inclosing-case wall, one in each space between the adjacent disks of the series, and each said guide reaching at the central portion of its engagement face or edge $e^2$, beyond the rim of the disk, with the opposite ends or extremities of such face or edge of the guide inclined or tapered, as shown at $e^3$, Fig. 7, toward the rim of the disk-flange, so as to be substantially in line with or coincident to the inner face of the flange. Upon the exterior perimeter of each disk of the series, except the first or "cent" disk, are set a series of studs or pins $a^2$, preferably near the edge of the disk, as shown, equal in number to and like equal distances apart as the series of digits on the peripheral faces of the disks, and so arranged that a pin corresponds to each digit, as shown in Figs. 2, 3, and 4. The said spring-arms E and their ends $e$ and fingers $e'$ and the guides E' and pins $a^2$ are so proportioned and located relatively to each other that when one of the disks of the series—as, for example, the disk A—concludes a full revolution on the common shaft the end $e$ of the arm E thereon will engage the face $e^2$ of the guide E', and the arm will consequently be forced toward the axis of the disks, so that the finger $e'$ of said arm will engage a pin $a^2$ of the series thereof on the next disk A', and will rotate the said disk A' with said disk A the distance between said pin and the next one of the series, and consequently the distance between one digit and the next of the series on the periphery of said disk A'. The end $e$ of the arm E of disk A will then slide off the guide E' and the spring of the arm will disengage the finger $e'$ thereof from said pin $a^2$, and the brake D will hold the said disk A' at rest until disk A has again completed a revolution and its arm E again engages the next pin of the series on disk A', as described.

Upon the front or exterior perimeter of the first or cent disk of the series (shown at A) are fixed the series of pins or studs $a^3$, equidistant from the axis of the disk and from each other, and equal in number to the number of figures in the series thereof on the peripheral face of the disk, which in the case of the disk shown is twenty, as heretofore described. Upon the opposite or flanged perimeter of the next disk of the series, which is the first "dollar-disk," is similarly fixed a series of pins or studs $a^4$, equal in number to the number of pins in the series on the perimetal face of said disk A, which in the case of said disk shown is twenty, as heretofore described.

F is a bar or rod which is seated and has play longitudinally in a corresponding recess $b$ in the forward end of the shaft B, and is provided with a handle or knob $f$ on its forward end beyond the face of the hand-wheel C'.

The bar F is adapted to rotate with the shaft B, which may be effected by making the bar rectangular in its corresponding recess, as shown.

The bar F carries two arms $f'$ and $f^2$, extending substantially at right angles to it and reaching through slots $b'$ in the shaft-body to and radially of the disk-surfaces somewhat past the line of the circle of pins $a^3$ and $a^4$ on the disks A and A', respectively. By means of this bar and its arms and the pins $a^3$ and $a^4$ on the respective disks A and A' either one of the said disks may at pleasure be brought into engagement and held to rotate with the shaft B. The arms are so located on their bar relatively to the said pins $a^3$ and $a^4$ on the disks that when the bar is moved rearward in the shaft B one of its said arms, as $f'$, will be in position to engage one of said pins on one of said disks, as A, while its other arm, as $f^2$, will stand beyond and clear of the series of pins on the other disk, as A', and vice versa when the bar is moved forward in the said shaft, as illustrated in Fig. 2. When, therefore, it is desired to employ the first or cent disk A to register cents, the bar F is pushed rearward, thus bringing the arm $f'$ into range with the series of pins $a^3$ on said disk and carrying the other arm $f^2$ out of range with the series of pins $a^4$ on the next disk A', and the operation of the hand-wheel C' will then cause the rotation of said cent-disk A. When, also, it is desired to register dollars, the bar is drawn forward, releasing disk A from engagement with said arm $f'$ of the bar and bringing arm $f^2$ into range with the pins on disk A', so that its engagement with one thereof will cause the rotation of said disk A' by the operation of the hand-wheel.

It is obvious that the location of the pins $a^3$ and $a^4$ on the disks A and A' may be reversed, the former being placed on the rear face of disk A and the latter on the front face of disk A', and the location of the bar-arms relatively to said pins be made as herein described, without material variation from this feature of my invention.

In the inclosing-case B' is formed or provided the slot $B^2$, extending over and common to the successive peripheral faces of all the disks of the series and adapted to permit a single one of the numbers of the series on each disk to be visible therein from the exterior of the case, as shown in Figs. 2 and 3.

In assembling the parts of the machine and arranging it for initial registering the disks are all placed with their zero-marks opposite to and showing in the slot $B^2$, and the spring-arm E of each disk is located thereon relatively to its peripheral figures or numbers so that said arm will engage and be operated, as heretofore described, by its guide E' while the disk is rotating the distance between the last number or digit of its series and the zero-mark at the conclusion of each full revolution of the disk.

In registering, the operation of the machine is as follows: To register cents—namely, five cents or multiples thereof—on the first disk A at slot $B^2$, the knob of the lever $C^2$ on the hand-wheel C' adjacent or opposite to the figure or figures on the dial C representing the number of cents to be registered is grasped by the hand of the operator and, the bar F being moved rearward, as shown in Fig. 2, the hand-wheel is rotated from left to right until the knob is opposite to zero on the dial, the rotation of the shaft B by the movement of the hand-wheel causing the disk A by its engagement with said shaft by the arm $f'$ of the bar F to rotate until the number on the disk A corresponding to the number selected on the dial is brought to and appears in the slot $B^2$, the entire movement being then stopped by the engagement of the lever $C^2$ with the pin $c^3$, and during such movement the remaining disks of the series being held at rest by their brakes D, as heretofore described. When ninety-five cents have been thus registered by a single movement or by successive partial rotations of disk A and it is desired to complete the registering of one hundred cents or one dollar, the further rotation of disk A will cause its arm E by engagement with a guide E' to engage the pin of the series $a^2$ thereof on disk A' which is opposite the digit 1 on said disk, and thereby effect the rotation of said disk A' the distance between its zero-mark and digit 1, thereby bringing said digit into view in said slot $B^2$. The arm E of the disk A will thereupon release disk A' and the further rotation of disk A during its next revolution will not affect said disk A' until said disk A again concludes said next revolution, when it will again engage and rotate said disk A' the distance to its ensuing digit 2 of the series. In like manner when disk A' concludes its revolution while it is rotating the distance between its last digit 9 of the series and its zero-mark it will by its arm E engage and rotate disk $A^2$ a like distance, so as to bring its digit 1 in line with the zero-mark of disk A' in the slot $B^2$, thereby marking or registering ten dollars in the slot by the two said figures on the visible portions of said two disks. The disks therefore successively register the sums of the total revolutions of the preceding disks of the series, and upon disk A there will always appear in the slot $B^2$ the number of cents less than one hundred, in multiples of five, registered by the described operation of the hand-wheel and dial, and upon the disks A' $A^2$, &c., the number of dollars, either as sums of the revolutions of the "cent-disk" or as independent registerings of the first dollar-disk A' and sums thereof.

By means of the bar F and its arms, in combination with the shaft B and the two disks A and A', arranged as described, I effect the registering of either dollars or cents by a single hand-wheel C' and dial C. The registering of cents by this means has been described; but when it is desired to register units of dollars upon or by the disk A' said disk is engaged to the shaft by the arm $f^2$ of bar F, as heretofore described, and the even multiples of five, as 10, 20, 30, &c., on the dial are alone regarded in rotating the hand-wheel, the initial figures of such numbers being alone used as indexes, as 1, 2, 3, &c. Thus to register one or more dollars up to nine the lever on the hand-wheel opposite the number on the dial thus corresponding to the number of dollars to be registered is grasped and the hand-wheel is rotated until such number aforesaid is brought opposite to zero on the dial. This rotation causes a similar rotation of the disk A', and consequently the digit of the series on said disk which represents the sum of the figure which appeared in slot $B^2$ when this movement began and the figure selected on the dial for registration will be brought by the said rotation of the disk A' to and be visible in said slot.

It is evident that the dial and the cent-disk A may be readily adapted to register units of cents up to ninety-nine without variation from this feature of my invention, and that in connection with such dial and cent-disk the dollar-disk A' may be combined by means of the bar F to operate substantially as set forth. It is also evident that a registering device constructed with the described mechanism may be employed to register quantities of other things or objects by adapting the disks to the purpose by substituting upon the peripheral faces thereof in an arrangement or series such as that herein described the signs, symbols, or index-figures appertaining to and illustrating the quantities desired to be registered.

What I claim as my invention, and desire to secure by Letters Patent, is—

1. In a registering device, the combination of a series of disks provided with peripheral faces, each face having thereon in a series digits or index-figures in uniform arithmetical progression mounted and free to rotate upon a shaft common to the series, each disk being adapted to engage at the conclusion of a revolution thereof and rotate its succeeding disk of the series the distance between two adjacent digits or figures of the series thereof thereon, a series of brakes bearing one upon each disk, an inclosing-case provided with a slot or aperture extending over and adapted to disclose one of the digits or figures on the periphery of each of the disks, a dial fixed on the exterior of said case and bearing in a similar series thereon the digits or figures borne by the disks, and an operating-wheel fixed on said common shaft centrally of said dial and provided with a series of knobs or handles equal in number and similar in relative location to the digital series on said dial, substantially as and for the purpose set forth.

2. In a registering device composed of a series of disks having peripheral faces, each bearing thereon a series of digits or index-figures, as described, mounted and free to rotate upon a shaft common to the series, each disk being adapted to engage at the conclusion of a revolution thereof and to effect the partial rotation of the next succeeding disk of the series, a series of brakes bearing one upon each disk, an inclosing-case provided with a slot or aperture adapted to disclose one of the figures on the periphery of each disk, a dial fixed on the exterior of said case and bearing in similar series thereon the figures borne by the disks, and an operating-wheel fixed on said common shaft, as set forth, and provided with a series of knobs or handles equal in number and similar in relative location to the figure-series on the dial, the combination therewith of a bar carried by, having longitudinal play in, and adapted to rotate with said common shaft, and provided with arms adapted to alternatively engage a pin of a series thereof on the perimeters of either of two disks of the series, which series of pins on each said two disks are equal in number and similar in relative location thereon to the figures of the series on the first disk, substantially as and for the purpose specified.

3. In a registering device, the combination, with a series of the described flanged disks A A' $A^2$, mounted and free to rotate on shaft B, common to said series, and each disk provided with a series of pins $a^2$, fixed on its perimeter, of a spring-arm E, carried by each disk, a fixed guide E', provided with the engagement-face $e^2$ and inclined ends $e^3$, adapted to be engaged by an end $e$ of said arm, and a finger $e'$, carried by said arm and adapted to engage a pin of the series thereof on the next succeeding disk of the described series, substantially as and for the purpose set forth.

4. In a registering device, the combination, with a series of the described flanged disks A A' $A^2$, mounted and free to rotate on a shaft B, common to the series, and each disk being provided with a described series of pins $a^2$ on its perimeter, of spring-arms E, carried one by each disk, and each arm provided with an end $e$ and finger $e'$, adapted to engage, respectively, a fixed guide E and a pin of the series thereof on the next succeeding disk of the series, together with brake-rods D, one impinging upon each of said disks and each provided with a spring adapted to press the rod into yielding contact with the disk, substantially as and for the purpose set forth.

5. In a registering device, the combination, with the disks A and A' of a series thereof having, respectively, the series of pins $a^3$ and $a^4$, as described, on their opposite perimeters, respectively, of the shaft B, on which said disks are mounted and free to rotate, and the bar F, seated in a corresponding recess in the shaft and capable of longitudinal play therein and adapted to rotate with said shaft, together with arms $f'$ and $f^2$, carried by said bar and adapted to engage alternatively, respectively, pins of the series thereof on either of the disks A or A′, substantially as and for the purpose specified.

THOMAS MUNNELL.

Witnesses:
S. B. HAMMEL,
MAMIE L. HAMMEL.